Aug. 20, 1968 H. C. SIBLEY ET AL 3,398,401

CODE COMMUNICATION SYSTEM

Filed Oct. 26, 1964 3 Sheets-Sheet 1

INVENTORS
H.C. SIBLEY AND
W. G. PETTITT
BY Forest B. Whitehead
THEIR ATTORNEY

CODE COMMUNICATION SYSTEM

Filed Oct. 26, 1964 3 Sheets-Sheet 2

INVENTORS
H.C. SIBLEY AND
W.G. PETTITT
BY
Forest B. Hitchcock
THEIR ATTORNEY

INVENTORS
H. C. SIBLEY AND
W. G. PETTITT

BY Forest B. Hitchcock

THEIR ATTORNEY

United States Patent Office 3,398,401
Patented Aug. 20, 1968

3,398,401

CODE COMMUNICATION SYSTEM

Henry C. Sibley, Spencerport, and Walter G. Pettitt, Rochester, N.Y., assignors to The General Signal Corporation, Rochester, N.Y., a corporation of New York Filed Oct. 26, 1964, Ser. No. 406,408
9 Claims. (Cl. 340—147)

ABSTRACT OF THE DISCLOSURE

A two way multiple station code communication system wherein roll call and control pulses are transmitted from a control office at the same carrier frequency by a single transmitter, the roll call pulses being distinguished by being of selected multiple bit duration in combination with a selected multiple bit off period. These roll call pulses and associated time spaces convey coded messages because of the selected duration of these intervals. Such coding conveys to the field station a mode for the system such as a rapid run-up roll call, a search mode, an indication mode, and a word advance mode.

Figure 1A:
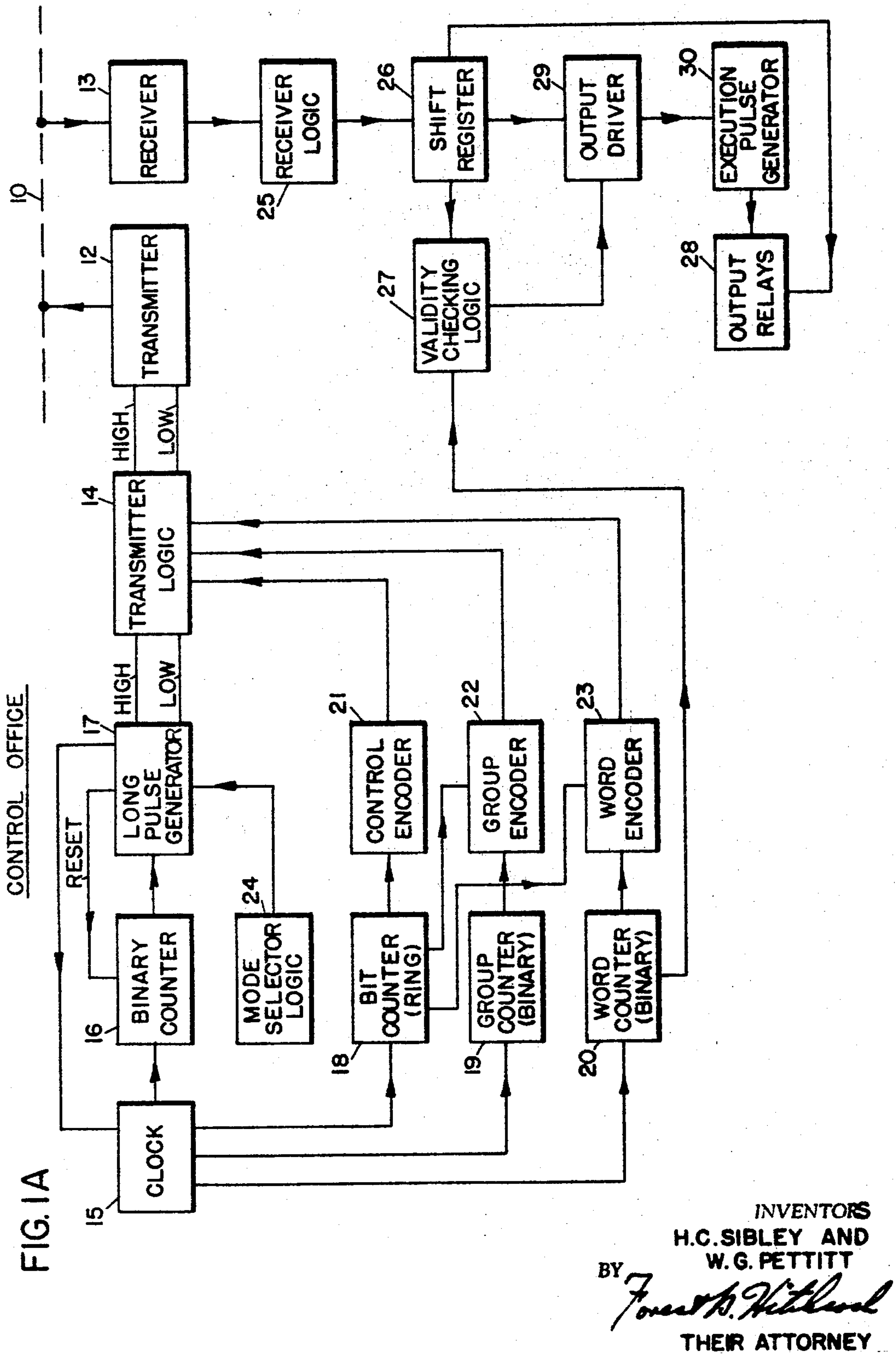

This invention relates to code communication systems, and it more particularly relates to two-way code communication systems wherein a control office is connected by a communication channel to a plurality of remote stations.

This system has utility in a pipeline control system, for example, or in a centralized traffic control system for railroads wherein devices at a plurality of remote stations are controlled by codes transmitted from a control office and indication codes selected by devices in the field are transmitted from the several field stations to the control office.

The code communication system according to the present invention is of the solid state type wherein the normal mode of the system is for the field stations to be continuously scanned by roll call pulses, one pulse for each field location, or for each station if there are a plurality of stations at one location, transmitted from the control office as a means to permit the field stations in turn to transmit indication codes to the control office indicative of conditions of certain apparatus at the field stations. The control office also uses the roll call pulses to designate field stations to receive control codes designated for transmission at the control office. The system is duplex in its operation in that the control office can both transmit control codes and receive indication codes at the same time. The control office transmits driving pulses during an indication cycle of operation, thus the rate of communication for both control and indication cycles of operation is determined by a single clock located at the control office.

Relatively long control pulses used for roll call, word advance, indication command and synchronization purposes at the end of a station scanning cycle are of a selected character, a selected duration, and are separated by selected time periods in accordance with the several transmitting modes. The system is normally transmitting roll call pulses in a search mode wherein the pulses are transmitted successively from the control office, one pulse for each station in a search mode, the roll call pulses being of a particular character, separated by relatively long time spaces to provide a sufficient time interval for the respective field stations that are called to initiate an indication cycle between pulses, if that station has indications to transmit.

For quick transmission of a control cycle to transmit control codes to a particular station, or for quick transmission of indications from a designated station to the control office, the system can be put into a quick run-up mode by the control office to quickly select a particular station to receive controls or to quickly run-up to a particular field station and designate that station to transmit indications. Such quick run-up is by the transmission of roll call pulses separated by a shorter time space between pulses. The time space between pulses can be made short in that no field station requires time to respond to its station call unless it has been designated as the station being called from the control office by the quick run-up series of pulses. This mode of operation is particularly desirable in systems such as pipeline control systems wherein an alarm has indicated that prompt action should be taken and wherein it is desirable to receive promptly indications of the conditions of apparatus at a particular field station.

To reduce to a minimum the amount of apparatus required at the several field stations, a shift register at each field station which is used for the reception of control codes is employed as a ring counter in selecting codes for transmission during an indication cycle. This means that the field station apparatus is simplex in its operation in that it cannot transmit indications at the same time that it is receiving control codes. However, the system is duplex in its operation in that a station is called for to transmit its indications at the same time that a different station is receiving control codes. Thus, when a station No. 10, for example, is called for to receive control codes, station No. 11 may be made responsive to the same station code for the transmission of indication codes, thus providing for duplex operation of the system.

An object of the present invention is to provide an improved roll call code communication system providing for quick run-up to a designated field station while locking out transmission from intermediate stations.

Another object of the present invention is to provide a duplex code communication system wherein control and indication cycles of operation are effective simultaneously for communication between a control office and two predetermined field stations respectively.

Other objects, purposes and characteristic features of the present invention will be in part obvious from the accompanying drawings, and in part pointed out as the description of the invention progresses.

Figure 1B:
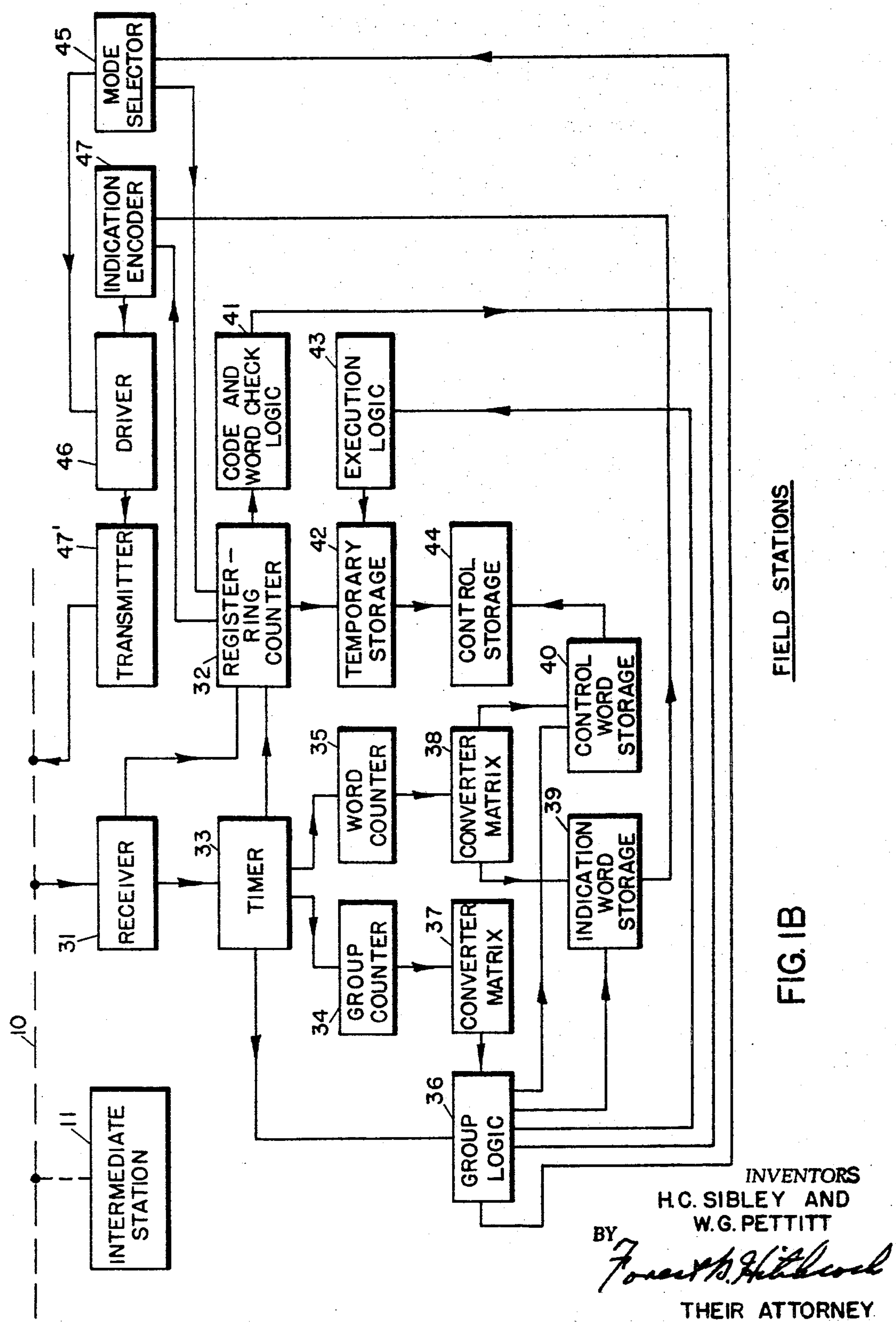
Figures 2, 3:
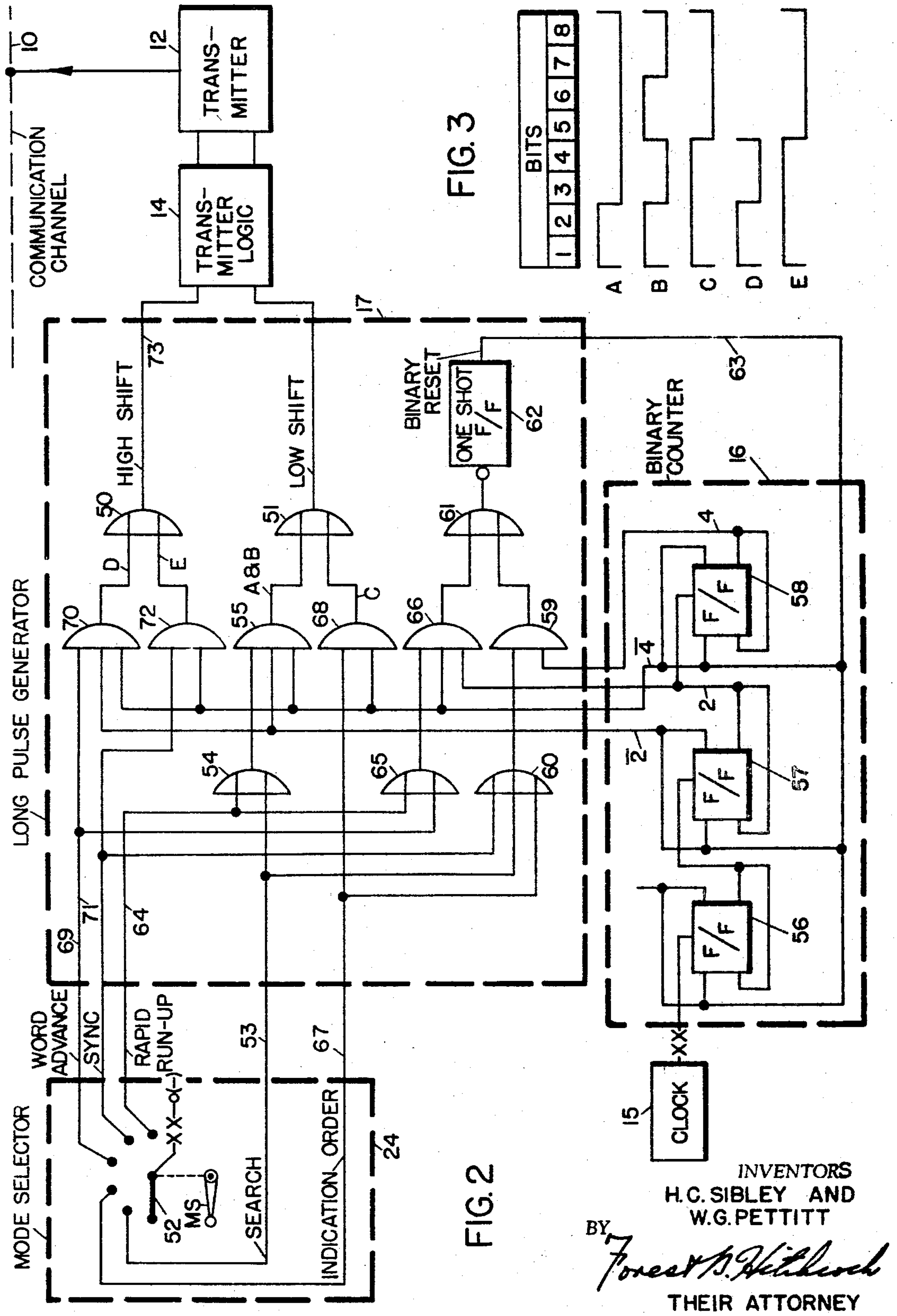

In describing the invention in detail, reference is made to the accompanying drawings wherein corresponding parts are identified in the several figures by corresponding reference characters; and wherein:

FIGS. 1A and 1B, when placed side-by-side, illustrate a code communication system according to one embodiment of the present invention;

FIG. 2 illustrates circuit logic relative to the selection of certain code characters for transmission from the control office; and FIG. 3 illustrates waveforms provided by certain stages of the circuit logic illustrated in the drawings.

The system comprises control office apparatus as shown in FIG. 1A, which is connected to a Communication Channel 10, and field station apparatus shown in FIG. 1B which is also connected to Communication Channel 10. The apparatus shown in FIG. 1B is all at the typical field station except for the block 11 which is used to represent an intermediate station.

With reference to FIG. 1A, a Transmitter 12 is provided at the control office for transmitting selected codes over the Communication Channel 10 and a Receiver 13 is provided for receiving indication codes transmitted from the field stations. The selection of codes for transmission from the control office is made by suitable Transmitter Logic 14. Communication of both control codes and indication codes is assumed for this embodiment of the present invention to be selected by high and low shift frequencies of a suitable carrier, but it is to be understood that other types of code characters can be used in accordance with the requirements of practice. Control and indication codes are transmitted on different carrier frequencies.

The rate of transmission is governed by a Clock 15 at the control office. The Clock 15 provides pulses which drive a Binary Counter 16 which is used in the control of a Long Pulse Generator 17. The Clock 15 also provides outputs which drive a Bit Counter 18, a Group Counter 19 and a Word Counter 20. The Counters 18, 19 and 20 control respectively a Control Encoder 21, a Group Encoder 22, and a Word Encoder 23. The Long Pulse Generator 17 is governed by Mode Selector Logic 24.

Upon the reception of indication codes by the Receiver 13 over the Communication Channel 10, the output of the receiver is applied through suitable Receiver Logic 25 to a Shift Register 26. The validity of the code stored in the Shift Register 26 is checked by Validity Checking Logic 27. Output relays 28 are selectively energized in accordance with the indication codes received by the Shift Register 26, subject to the Validity Checking Logic 27 which controls, jointly with the Shift Register 26, an Output Driver 29, which in turn controls an Execution Pulse Generator 30. The Execution Pulse Generator 30 provides an execution pulse to permit the Output Relays 28 to be controlled by a parallel readout of the Shift Register 26 after the integrity of the communication of the indication codes has been checked.

With reference to FIG. 1B, the receiving apparatus at a typical field station comprises a Receiver 31 which is connected to the Communication Channel 10. The Receiver 31 provides pulses for driving a Register-Ring Counter 32, and for providing input for a Timer 33 that is used in the detection of pulses for different control purposes that are longer than the usual single or half bit pulses used for message transmission. In accordance with the detection of such pulses, the Timer 33 has outputs which control respectively a Group Counter 34, a Word Counter 35 and Group Logic 36, which is related to rendering the transmitter and receiver effective when the particular station is being called. An output of the Group Counter 34 is applied through a Converter Matrix 37 to the Group Logic 36. The Group Logic 36 also registers and stores the group identified by code in a first word transmitted for that particular location so that subsequent words of a series will be received as being associated with the particular group identified by code during communication of the first word. An output of the Word Counter 35 is applied through a Converter Matrix 38 to an Indication Word Storage 39 and to a Control Word Storage 40.

Code and Word Check Logic 41 is provided for checking the integrity of the code in the Register-Ring Counter 32. If the storage in the Register-Ring Counter 32 checks properly, such storage is transferred to a Temporary Storage 42, from which the control codes can be executed by Execution Logic 43 which is rendered effective when the next word is transmitted, or in case of the last word of a series, while the next station is called by the roll call scanning system. Thus, the Execution Logic 43 is controlled by the Group Logic 36 so that it is rendered effective to execute the stored control codes to provide an input for a Control Storage 44 when the next station is called by the roll call system.

A Mode Selector 45 at the typical field station is controlled in accordance with the condition of the Group Logic 36. The Mode Selector 45 determines when the apparatus at the associated station is to be conditioned for the reception of a control cycle and when the apparatus at the associated station is to be conditioned for the transmission of indication codes. If it is determined in the Mode Selector 45 that an indication cycle is to be transmitted, this selector renders a suitable Driver 46 operable to provide pulses to a Transmitter 47', and it also provides for the control of the Register-Ring Counter 32 to operate as a ring counter to effectively step the system through an indication cycle for transmission of indication codes. The Register-Ring Counter 32 provides a drive for an Indication Encoder 47 which selects the codes for transmission during the respective bits of an indication cycle in accordance with the condition of apparatus at the associated station to have its indications transmitted.

With reference to FIG. 2, circuit logic is illustrated for the Long Pulse Generator 17 showing the use of gates in combination with the Binary Counter 16, the Clock 15, and the Mode Selector 24 for generating pulses for roll call and other specific purposes which are of longer duration than the pulses used for driving the system during a control or an indication cycle. The selective energization of the high and low shift wires of the Long Pulse Generator 17 determines the character of energization to be transmitted over the Communication Channel 10 under certain conditions for roll call, word advance and synchronizing purposes. Energy is applied to the high shift wire through an OR gate 50, and energy is applied to the low shift wire through an OR gate 51. Either the OR gate 50 or the OR gate 51 can have an output of two or four bit duration, dependent upon the condition of the Mode Selector 24.

Although the Mode Selector 24 is illustrated as comprising a manually operable switch MS, it is to be understood that this representation is made more to simplify the disclosure of the invention, rather than to limit the number of forms that the invention may assume. In actual practice, the energization of some of the output wires of the Mode Selector switch MS is caused manually, and the energization of other outputs is made automatically in accordance with the progress of the operation of the code communication system. In other words, the system as a whole determines at what time in an operating cycle a word advance pulse or a synchronizing pulse is to be transmitted, such selection being indicated in the drawings by XX in the connection of negative energy to the heel of the wiper 52 of switch MS.

If the Mode Selector Switch MS is moved from the OFF position illustrated to its next position in a clockwise direction, energy is applied to wire 53 through switch contact 52 to provide an input for the Long Pulse Generator 17 to cause the Long Pulse Generator 17 to transmit continuously successive series of search roll call pulses. These pulses are of the type illustrated by waveform A in FIG. 3. These pulses are illustrated as being of two-bit duration, and they are separated by a time space of six-bit duration so that each field station will have an opportunity to respond to its particular roll call so as to stop the roll call procedure if that station has new indications to be transmitted to the control office. Energy on the search control wire 53 is applied to an OR gate 54 and the output of the OR gate 54 is applied to an AND gate 55. The AND gate 55 also requires that energy be applied by the Binary Counter 16 to the wires $\overline{2}$ and $\overline{4}$ of that counter. The Binary Counter 16 comprises flip-flops 56, 57 and 58 as conventional first, second and third stages. Wire $\overline{2}$ is energized when there is a ZERO output of the second stage of the Binary Counter 16, and wire $\overline{4}$ is energized when there is a ZERO output of the third stage. Thus, just after the Binary Counter 16 has been reset, energy is applied to both wires $\overline{2}$ and $\overline{4}$ and to the wire 53 so that the AND gate 55 has an output through OR gate 51 to control the application of low shift energy to the Communication Channel 10 by the Transmitter 12. The Binary Counter 16 counts the bits that are generated by the Clock 15, and thus, after two bits have been counted, the second stage of the Binary Counter 16 has a ONE output and the AND gate 55 is opened to terminate the transmission of the search pulse over the Communication Channel 10.

When the Binary Counter 16 advances to the fourth count, assuming the system is in a search mode, there is a ONE output of the third stage of the Binary Counter 16 applied to wire 4 which renders an output effective for an AND gate 59, that gate already having an input applied through OR gate 60 from wire 53. The output of AND gate 59 is applied through an OR gate 61 to a one-shot multivibrator 62. The purpose of the one-shot multivibrator 62 is to provide a reset pulse for resetting the Binary Counter 16. This one-shot multivibrator is not rendered operable in response to the output of the OR gate 61, but is rather rendered effective to reset the Binary Counter 16 upon removal of such input energy. Thus, the Binary Counter 16 becomes reset when the output of the third stage of the counter that is applied to the AND gate 59 is changed from a ONE to a ZERO. This terminates the off period in transmission of the roll call code over Communication Channel 10.

If a field station has responded to a particular search character transmitted over the Communication Channel 10, the energy, which has been considered as being applied to wire 53 in the Mode Selector 24, is removed, and there is no further transmission of search pulses until after the cycle of operation has been transmitted by the field station. Such selection has been indicated by the connection of wiper 52 of switch MC to (−) through selections represented as XX. If no field station transmits in response to a search pulse that has been transmitted, the Long Pulse Generator 17 is operable to transmit a following search pulse by the same mode of operation that has been heretofore described for the transmission of a first search pulse, the Binary Counter 16 having been reset over wire 63 by the one-shot multivibrator 62.

To consider another mode selected by the Mode Selector 24, it will be assumed that a control has been designated for transmission to a particular field station. It will further be assumed that it is desirable that this control be transmitted as soon as possible. In order to do this, the system is put into a rapid runup mode by the operation of the switch MS to its last clockwise operated position. This applies negative energy through selections indicated by XX, which will determine when the rapid runup is to be interrupted, to the rapid runup wire 64, which in turn renders the OR gate 54 conductive to provide an output which is effective to cause the generating of pulses of two-bit duration of the low shift frequency, the same as has been heretofore described as generated when the system is in a search mode. The rapid runup mode differs from the search mode, however, in that energy on wire 64 also provides energization for an OR gate 65 which is effective through an AND gate 66 and through OR gate 61 to reset the Binary Counter 16 upon the removal of energy from wire 2 when the second stage of the Binary Counter 16 is shifted in its output from a ONE to a ZERO. Thus, the rapid runup pulses generated by the Long Pulse Generator 17 are of two-bit duration, and are separated by a two bit off period as is illustrated in the waveform B of FIG. 3. When the proper number of pulses have been transmitted to call the station that has been designated to receive controls, the negative energy is removed from the heel of the wiper arm 52 of the Mode Selector MS, and the office proceeds to transmit a control cycle of operation. Because of the two bit spacing between the rapid runup pulses, the intermediate field stations that are called by the roll call pulses cannot interrupt the rapid runup roll call to transmit indications.

A similar mode of operation is effective when it is designated at the control office that a particular field station should transmit its indications. When such an indication order is given, there is a rapid runup transmission of roll call pulses to that station, and then, as if the Mode Selector Switch MS were operated to its third position in a clockwise direction, energy is applied to indication order wire 67, which is effective to render an AND gate 68 conductive to provide a low shift control for the transmitter 12 through OR gate 51. This pulse has a four-bit duration because the AND gate 68 is maintained conductive as long as there is a ZERO output from the third stage of the Binary Counter 16. The indication order control wire 67 is connected to the OR gate 60 which governs the control of the one-shot multivibrator 62 for the resetting of the Binary Counter 16 on the count of 8. This is according to the mode of operation that has been heretofore described where the OR gate 60 was assumed to be energized from the search control wire 53.

If the Mode Selector 24 is actuated so that energy is applied to the word advance wire 69, it is selected that the Long Pulse Generator 17 is to generate a high shift frequency pulse of two-bit duration which is followed by a two-bit off period. This pulse is transmitted at the end of transmission of a word so as to advance the word counter at the field station receiving the transmission to condition it for the reception of the next word. Energy on wire 69 conditions the AND gate 70 so that an output is provided according to the waveform D of FIG. 3 by the transmitter 12 of high shift frequency with the pulse being of two-bit duration. The Binary Counter 16 is reset following a word advance pulse in accordance with energy applied from wire 69 to the OR gate 65 which causes the one-shot multivibrator 62 to reset the Binary Counter 16 when the wire 2 becomes deenergized in accordance with the changing of the output of stage 2 from a ONE to a ZERO.

A high shift output pulse is selected for transmission over the Communication Channel 10 by the transmitter 12 for a duration of four-bits for synchronization purposes when the Mode Selector 24 is conditioned as by the operation of the switch wiper arm 52 to the position for connection of the wiper 52 with the synchronization wire 71. This applies energy through an AND gate 72 and through OR gate 50 to the high shift control wire 73 until the third stage of the Binary Counter 16 is actuated from a ZERO output to a ONE output so as to remove energy from wire $\overline{4}$. The counter 16 becomes reset after transmission of a synchronization pulse in accordance with the connection of wire 71 to the OR gate 60 and in turn to the AND gate 59 so as to trigger the one-shot multivibrator 62 when the third stage of the Binary Counter 16 is changed from a ONE output to a ZERO output and thus energy is removed from wire 4. Waveform E of FIG. 3 illustrates the synchronization pulse that is generated as has been described.

Upon the reception at the field stations of the different types of pulses that have been described as being generated by the Long Pulse Generator 17, the Timer 33 at each of the field stations is adapted to distinguish the different lengths of pulses that are received and to control the Group Logic 36, the Group Counter 34 and the Word Counter 35 accordingly.

Having thus described one embodiment of the present invention as applied to a specific supervisory control system, it is to be understood that various adaptations, alterations and modifications may be applied to the specific form shown.

What we claim is:

1. In a multiple station code communication system having a communication channel connecting a control office with a plurality of field stations, designating means at the control office for designating any one of a plurality of different roll call modes for the communication system, and roll call pulse transmitting means at the control office for selectively applying to the communication channel successive roll call pulses, one for each field station, the pulse being of selected duration and spaced by selected duration time spaces, said roll call transmitting means having a counter for counting the number of bits duration of each roll call pulse and each time space following each roll call pulse, and said roll call pulse transmitting means having gating logic controlled jointly by said counter and by said designating means for selectively determining the number of bits duration of each roll call pulse and of each time space between pulses in accordance with the particular roll call mode designated by said designating means.

2. The invention according to claim 1 wherein said counter is a binary counter, and the duration of each of the roll call pulses is for a selected plurality of clock bits counted by said binary counter.

3. The invention according to claim 1 wherein said gating logic resets said counter after termination of each roll call pulse.

4. In a multiple station code communication system having a communication channel connecting a control office with a plurality of field stations, transmitting means at the control office operable when rendered effective to transmit energization pulses of selected character over the communication channel to the field stations, designating means at the control office, comprising a mode selector for designating any one of a plurality of different messages for communication to the field station, and roll call control means at the control office controlled by said mode selector for rendering said transmitting means effective to transmit a series of time spaced pulses over the communication channel to the field stations, one pulse for each field station, said roll call control means being effective to select the character of energization of the communication channel by said transmitting means for each roll call pulse in accordance with the message selected by said mode selector, and said roll call control means being also effective to select one of a plurality of time durations for said roll call pulses in accordance with the message selected by said mode selector.

5. The invention according to claim 4 wherein said roll call control means is also effective to select one of a plurality of time intervals between roll call pulses in accordance with the condition of said designating means.

6. The invention according to claim 4 wherein said roll call means includes a binary counter for counting a number of bits selected by said designating means to determine the time duration of the roll call pulses.

7. In a multiple station code communication system having a communication channel connecting a control office with a plurality of field stations, transmitting means at the control office operable when rendered effective to transmit pulses of selected character and time duration over the communication channel to the field stations, designating means at the control office for designating any one of a plurality of different messages for communication to the field stations, pulse generating means at the control office for generating time spaced output pulses at a fixed rate, a binary counter for counting said output pulses, long pulse generating means controlled by said designating means and said counter jointly for generating multiple bit pulses for transmission by said transmitting means, said long pulse generating means comprising a plurality of AND and OR gates each of which is controlled jointly by said designating means and said pulse generating means for determining the character and number of bits duration of each of said multiple bit pulses, said long pulse generating means also comprising a plurality of AND and OR gates each of which is controlled jointly by said designating means and said counter for determining the time duration of a time interval between said multiple bit pulses in accordance with the condition of said designating means.

8. The invention according to claim 7 wherein resetting means controlled by said long pulse generating means is provided by resetting said binary counter at intervals selected by said designating means.

9. The invention according to claim 8 wherein said resetting means includes a binary device having its input controlled by said long pulse generating means and effective to deliver output to reset said counter upon termination of its input.

References Cited

UNITED STATES PATENTS 3,133,267 5/1964 White -------------- 340—147

JOHN W. CALDWELL, *Primary Examiner.*

DONALD J. YUSKO, *Assistant Examiner.*